US007050820B2

(12) United States Patent
Khan

(10) Patent No.: US 7,050,820 B2
(45) Date of Patent: May 23, 2006

(54) TELEPHONY SYSTEM PAGING SYSTEM AND METHOD

(75) Inventor: Saima S. Khan, Metairie, LA (US)

(73) Assignee: Aspect Software, Inc., Westford, MA (US)

( * ) Notice: Subject to any disclaimer, the term of this patent is extended or adjusted under 35 U.S.C. 154(b) by 631 days.

(21) Appl. No.: 09/998,249

(22) Filed: Nov. 30, 2001

(65) Prior Publication Data

US 2003/0104825 A1 Jun. 5, 2003

(51) Int. Cl.
*H04Q 7/20* (2006.01)

(52) U.S. Cl. ..................... 455/458; 455/417

(58) Field of Classification Search ............. 455/417, 455/558, 459, 460, 461, 458; 379/265, 266, 379/210, 211, 309; 340/7.46, 5.74
See application file for complete search history.

(56) References Cited

U.S. PATENT DOCUMENTS

| 5,566,339 | A | * | 10/1996 | Perholtz et al. | ............. | 713/340 |
| 5,577,112 | A | * | 11/1996 | Cambray et al. | ...... | 379/265.03 |
| 6,266,407 | B1 | * | 7/2001 | Kneipp et al. | ......... | 379/265.02 |
| 6,490,350 | B1 | * | 12/2002 | McDuff et al. | ........ | 379/265.06 |
| 6,510,220 | B1 | * | 1/2003 | Beckett et al. | ......... | 379/265.06 |
| 6,751,310 | B1 | * | 6/2004 | Crossley | ................ | 379/266.07 |

* cited by examiner

*Primary Examiner*—Jean Gelin
(74) *Attorney, Agent, or Firm*—Bourque & Assoc.

(57) ABSTRACT

A dynamic paging system and method, especially adapted for use in a computer telephony system wherein the dynamic paging system includes a condition monitor adapted to monitor conditions of a computer telephony system and, upon the occurrence of one or more pre-defined conditions, to trigger the placement of a pager telephone call by a pager telephone call processor that generates and sends a pager telephone call. The system also includes a pager graphical user interface (P-GUI) which is configured to facilitate the changing or modification of a pager telephone number to be dialed by a person with little or no computer programming expertise.

4 Claims, 4 Drawing Sheets

TELEPHONY SYSTEM PAGING SYSTEM AND METHOD

FIELD OF THE INVENTION

The present invention relates to computerized telephony systems and, in particular, to a system and method of paging a desired telephone number upon the occurrence of one or more predefined condition. More particularly, the system and method facilitates the changing of pager telephone numbers dialed by the paging system.

BACKGROUND OF THE INVENTION

Automated telephone systems, which coordinate and optimize performance of operators of facilities for out-dialing large volumes of telephone calls and which receive large volumes of telephonic requests for information, are well known. Such systems typically involve a plurality of operators using telephones and operating terminals connected to computerized telephone management systems. These systems typically include autodialers, which improve the efficiency of operations with high volume outbound calling requirements.

Computerized telephony systems increase operator or agent productivity significantly and provide management with a tool for streamlining and controlling operations. These systems automatically place outbound calls from a predetermined list of phone numbers and keep track of no answers, busy signals, and other line conditions and connect live calls to an agent who is simultaneously furnished a data screen having information regarding the account of the phone number reached. In high volume calling operations, such as collections, direct telephone sales, fund raising and market research and polling, among others, these systems provide flexibility in the rate of call placement and can provide significant data management options.

Typical computerized telephony systems are monitored and controlled by a system supervisor, who can schedule and direct call campaigns and monitor statistics relating to call scheduling. However, there are times when it would be more cost effective to have an "on-call" supervisor, instead of having a supervisor physically present at a call center during the entire processing of a call campaign. In such cases, upon the occurrence of certain, specified conditions, the on-call supervisor will need to be contacted, advised of the condition and potentially provide input to personnel located at a call center.

One way of easily reaching persons regardless of their physical locations involves the use of portable pagers. Such pager systems utilize small, portable receiver or even transceiver devices that are carried by persons. In the event a person carrying such a device is desired, a party seeking to contact the person would call a telephone number assigned to the specific pager. The pager system would then transmit a message to the desired device. The message typically includes a telephone number of the person seeking to reach the paged person. The transmitted telephone number is displayed on an LCD or other display device on the pager. The person receiving the page would then contact the party paging him or her by calling the telephone number transmitted to his or her pager.

Currently, computer telephony systems are limited in their paging capabilities. One such system that has been utilized by the assignee of the present invention allows a telephone number that is assigned to a pager to be dialed, via a modem line, upon the occurrence of pre-specified conditions at a call center. However, the current systems utilize hard coded pager telephone numbers, which hampers the flexibility of the system. Thus, in order for different on-call supervisors to be paged, either a single pager must be physically transferred from one on-call supervisor to his or her successor or a different pager number must be hardcoded into the system. As can be appreciated, either scenario is not optimal since it would either require successive supervisors to physically meet or require an on-site programming expert.

Thus, there is a need for a system and method for modifying a pager number to be paged upon the occurrence of a pre-specified condition.

SUMMARY OF THE INVENTION

Accordingly, a dynamic paging system and method, especially adapted for use in a computer telephony system, is provided. The dynamic paging system includes a condition monitor adapted to monitor conditions of a computer telephony system and, upon the occurrence of one or more pre-defined conditions, to trigger the placement of a pager telephone call by a pager telephone call processor that generates and sends a pager telephone call record via a modem and telephone line. The system also includes a pager graphical user interface (P-GUI), which is configured to facilitate the changing or modification of a pager telephone number to be dialed by the dynamic paging system.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
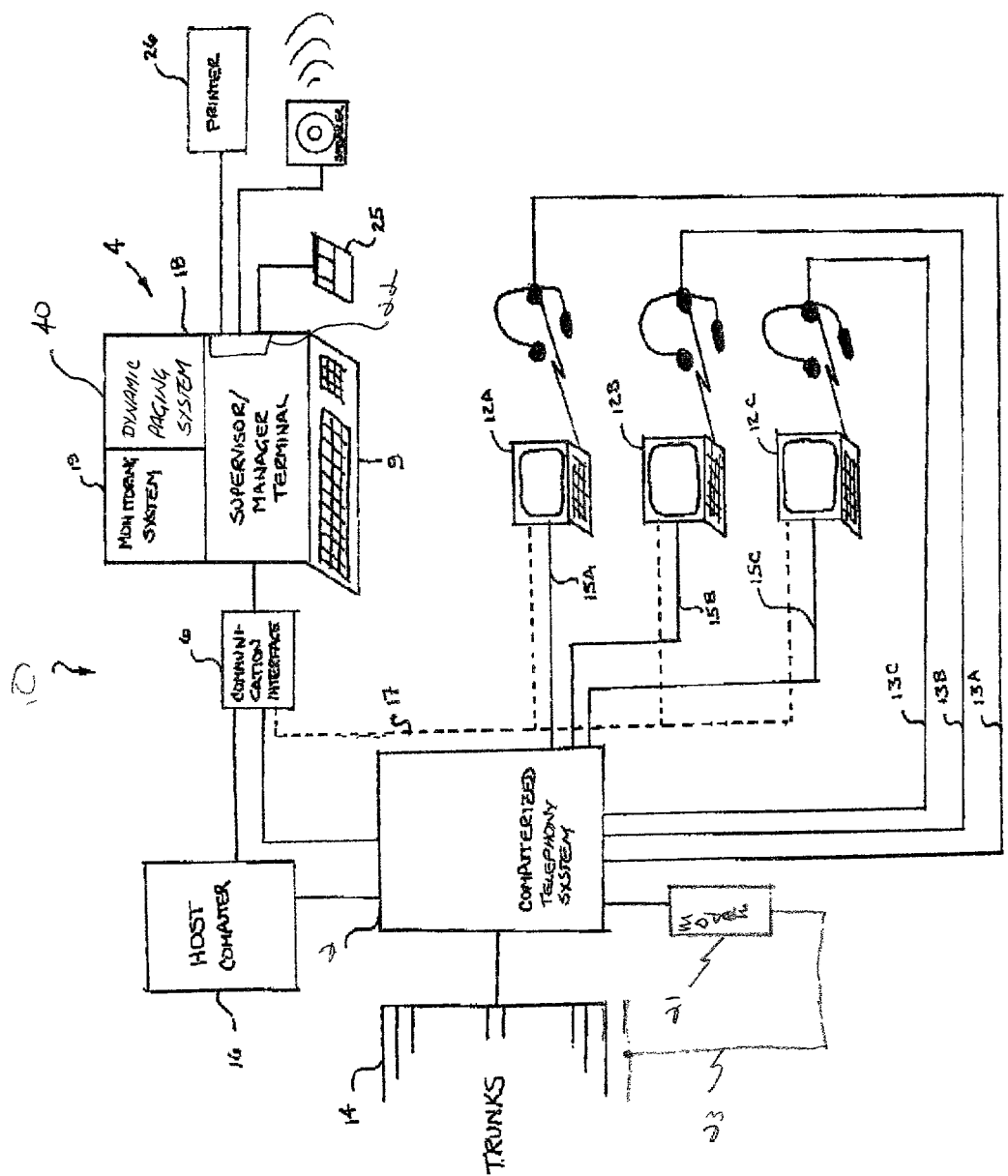
FIG. 1 is a block diagram of a computerized telephony system including a dynamic paging system according to one embodiment of the present invention.

Referring now to one embodiment of a system on which can be implemented the present invention shown in FIG. 1, a computerized telephony system, generally designated as 10 is shown. The computerized telephony system includes a telephony processing system 2 and one or more telephony management systems 4. Each telephony management system 4 communicates with the telephony processing system 2 via a communications interface 6. A variety of embodiments are contemplated by the present invention, which include alternative forms of or even a lack of a formal communications interface. Examples include hard-wired management system, which are physically connected to the telephony processing system 2, management systems that communicate with data telephony processing the system via a local area network (LAN) using LAN devices, management systems that communicate with the telephony processing system over telephone lines using modems, and management systems that communicate with the telephony processing system over wide area networks (WANs), such as the Internet, using any combination of modems and/or WAN devices.

Telephony processing system 2, which may be, for example, a computerized autodialing system, typically used in high volume out-dialing environments such as collection departments, is utilized as the hub of the system. A plurality of agent terminals 12a, 12b, 12c are connected to the processing system 20, which automatically dials out-bound calls from a predetermined list of phone numbers over a variable number of phone lines or trunks 14 and receives incoming calls. A modem 21 and modem telephone line 23 are provided which are normally used to dial into the telephony processing system 2, but which can laso be used to place outgoing pager telephone calls.

The computerized telephony system 10 generates event signals upon the occurrence of events such as no answers, lines that are busy, network intercepts or lines answered by message machines, and connects live calls to any one of the several agents 12a–12c over voice transmission lines 13a–13c. Upon transferring a live call to any one of the several agents, the telephony processing system 10 also transfers selected data from host computer 16 to the agent terminal over a data transmission line 15a–15c. Alternatively, data may be transferred over an optional network line 17 to an agent from the telephony management system 4 via communications interface 6.

The furnished data may be retrieved by the telephony processing system 10 from a host computer 16 having mass storage and database management capabilities. The agent receiving the call addresses questions and/or collects information, accessing the host computer 16 to store or retrieve the required information.

The telephony processing system 10 continues automatically placing out-bound calls and/or receiving inbound calls and directing the calls to available agents while generating event signals in response to the placed calls and also transmitting event signals which can be utilized to generate statistics on agent and system performance.

Figure 2:
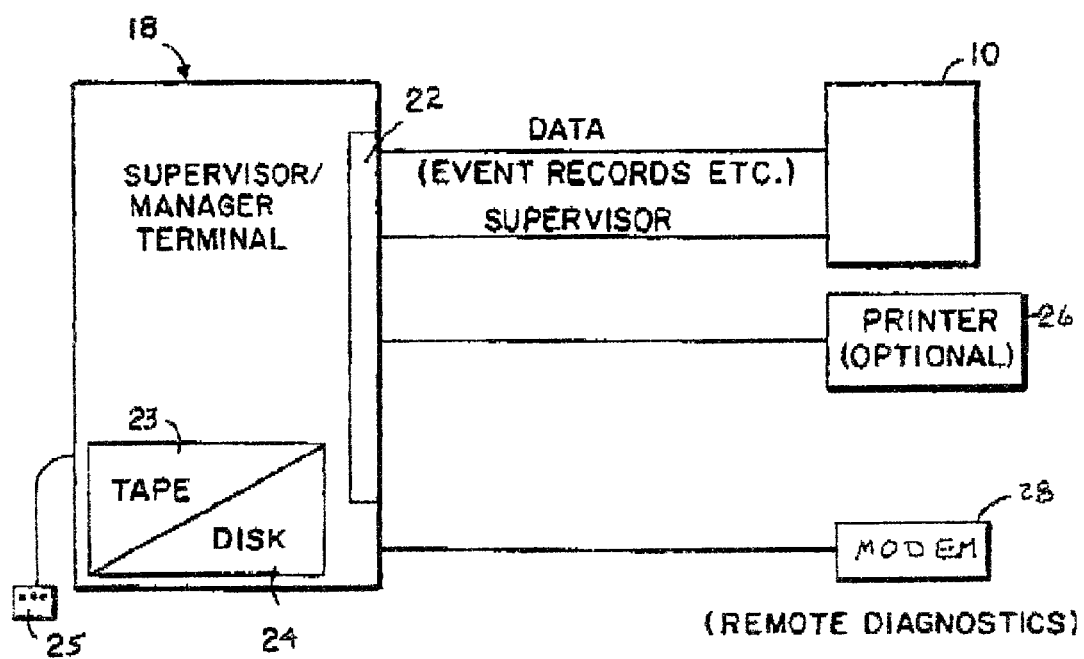
FIG. 2 is a more detailed block diagram of the supervisor/manager terminal of FIG. 1.

The management system 4 includes a supervisor/manager terminal 18 as illustrated in FIGS. 1 and 2, which is linked to the telephony processing system 10 and assists in the management of the telephony system. The supervisor/manager terminal 18 typically comprises an integrated monitoring system 19 for providing the supervisor real-time access regarding the telephony system and the campaigns that it is processing. The supervisor/manager terminal 18 further comprises a dynamic paging system 40, which provides the supervisor with the ability to select one or more parties to contact in the event of the occurrence of one or more pre-defined condition(s), as will be explained in greater detail below.

The supervisor/manager terminal 18 is preferably a smart terminal such as a reduced instruction set computer based parallel processing unit utilizing a UNIX Operating System, such as a Sun Sparc UNIX workstation. Alternatively, other UNIX based platforms can be used, such as a Pentium® processor-based P.C. running UNIX or an IBM\RS6000, for IBM compatibility. The processor can be loaded to run off-the-shelf software for accessing the database resident on the host computer 16. Preferably, the supervisor/manager terminal 18 is configured with a multi-port synchronous/asynchronous interface 22 and substantial mass storage capabilities such as a tape drive 23 for system backup and a disk drive 24 for maintaining a supervisor/manager terminal 18 resident database. A point and click mouse 25, having as many as three buttons, provides a suitable user interface to permit minimization of keyboard entries on keyboard 9. Speaker 27 may also be provided to produce an audible alarm or voice instruction to alert a system supervisor of an alert condition.

As shown in FIG. 2, the supervisor/manager terminal 18 is interfaced to the telephony processing system 10 directly through the synchronous/asynchronous interface 22, which, in this exemplary embodiment, serves as the communications interface 6. However, additional communications strategies, as mentioned above, are contemplated by the present invention.

A printer 26 can optionally be provided and which may be dedicated to the supervisor/manager terminal 118 to provide hard copy output of reports which may be generated at the terminal using an off-the-shelf spread sheet package. Optionally, a modem 28 can be provided for remotely accessing the supervisor/manager terminal 18, for performing system diagnostics and debugging from remote sites. With embodiments incorporating management systems 4 that are remote from the telephony system 10, the same communications interface 6, which interfaces the management system with the telephony system, may be utilized for remote access to the supervisor/manager terminal 18.

A graphical user interface facilitates data access and manipulation and process monitoring and control through the point and click mouse 25 user interface which is menu and icon driven in accordance with a graphical user interface based on Open Windows running under the UNIX Operating System. Icon features enable a supervisor, using the mouse 25, to quickly move between functions by pointing and clicking to select either information or actions available on the supervisor/manager terminal 18.

Major supervisory functions are identified on the supervisor/manager terminal 18 by icons, as illustrated and more fully described in commonly owned U.S. Pat. No. 5,577, 112, which is fully incorporated herein by reference.

Figure 3:
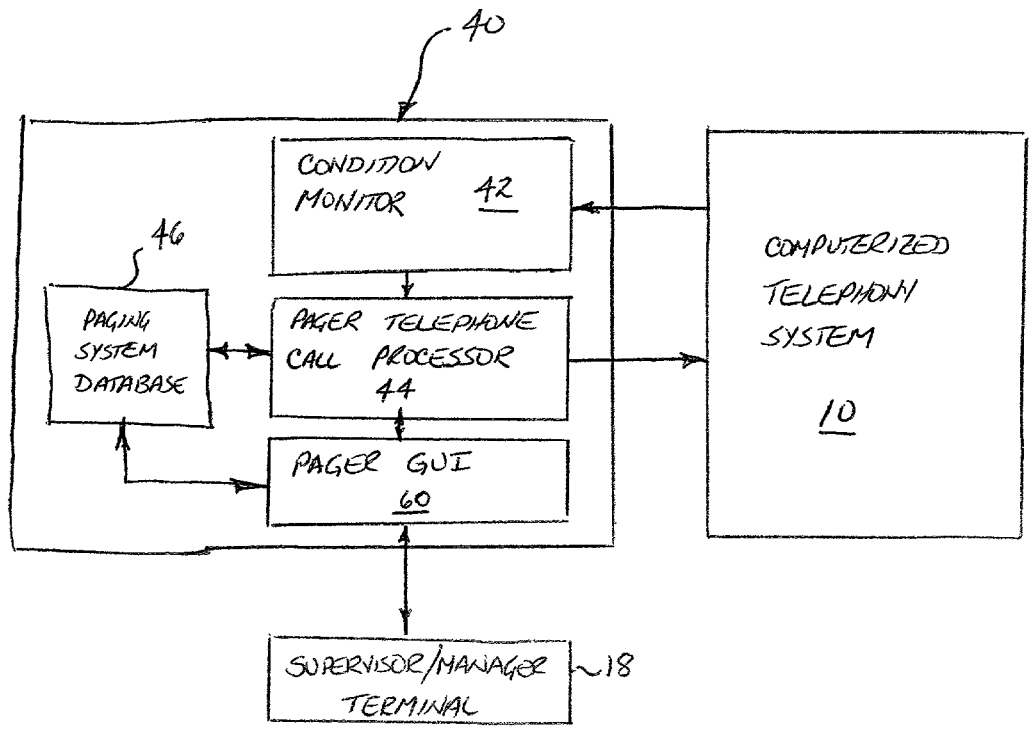
FIG. 3 is a more detailed block diagram of the dynamic paging system of FIG. 1.

Turning now to FIG. 3, one embodiment of a dynamic paging system 40 according to the present invention is shown. The dynamic paging system 40 includes a condition monitor 42, which monitors a variety of conditions of the telephony processing system 10 (FIG. 1). For example, common conditions that may be monitored include, but are not limited to, download failure; upload failure; and payday roll failure. The condition monitor 42 may also monitor conditions such as the number of call records remaining in a call campaign that have not yet been dialed. It may further monitor statistics compiled by the telephony system during the processing of a call campaign, such as the ratio of live answers to the total number of calls placed. In any event, the condition monitor can be configured by the user to monitor almost any pre-defined condition of interest that may occur during the processing of a call campaign.

When the condition monitor 42 detects one or more pre-defined condition(s), it triggers a pager telephone call processor 44 to generate and send a pager telephone call record to the proper party by utilizing a modem 21 and modem telephone line 23.

To ensure that a proper party is contacted, the pager telephone call processor 44 queries a paging system database 46, in which data related to paging call records is stored. For example, the pager telephone call processor may run a prepared script and, when necessary, access the paging system database 46 to retrieve a proper telephone number to be called. In this manner, a designated party can be contacted and apprised of the occurrence of at least one pre-defined condition during the processing of a call campaign.

Figure 4:
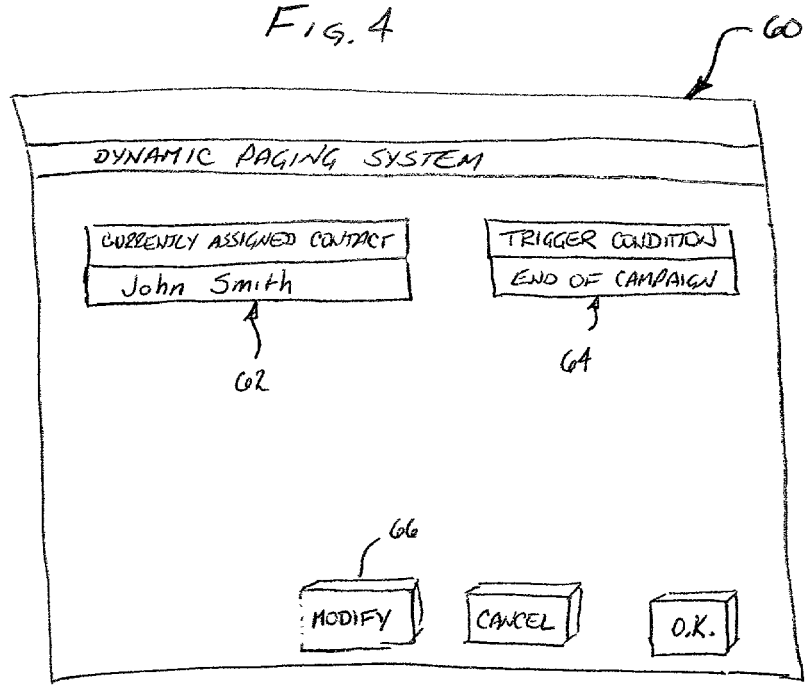
FIG. 4 is a screen display showing one embodiment of a pager GUI according to one embodiment of the system of the present invention.

In order to facilitate the management of the conditions that trigger the generation and dialing of a pager telephone call record as well as the party to which a pager telephone call is directed, one embodiment of the present invention also includes a Pager Graphical User Interface (P-GUI) 60 (FIG. 4). The P-GUI 60 is displayed on the supervisor/manager terminal 18 (FIG. 3) and allows a person with little or no computer programming expertise to modify a condition or series of conditions that will trigger the generation of a pager telephone call record to be dialed by a computerized telephony systems. The P-GUI will also facilitate the modification of parties to which a pager telephone call is placed or the addition or removal of parties to which a pager telephone call may be directed.

In order to manage the party to which a pager telephone call is directed, the P-GUI 60 includes an assigned contact field 62 and a trigger condition field 64. The assigned contact field 62 and the trigger condition field 64 display an identifier for a currently assigned contact party and at least one condition that will trigger the generation and processing of a pager telephone call record, respectively. Examples of trigger conditions include download failure, upload failure and pdayroll failure.

Figure 5:
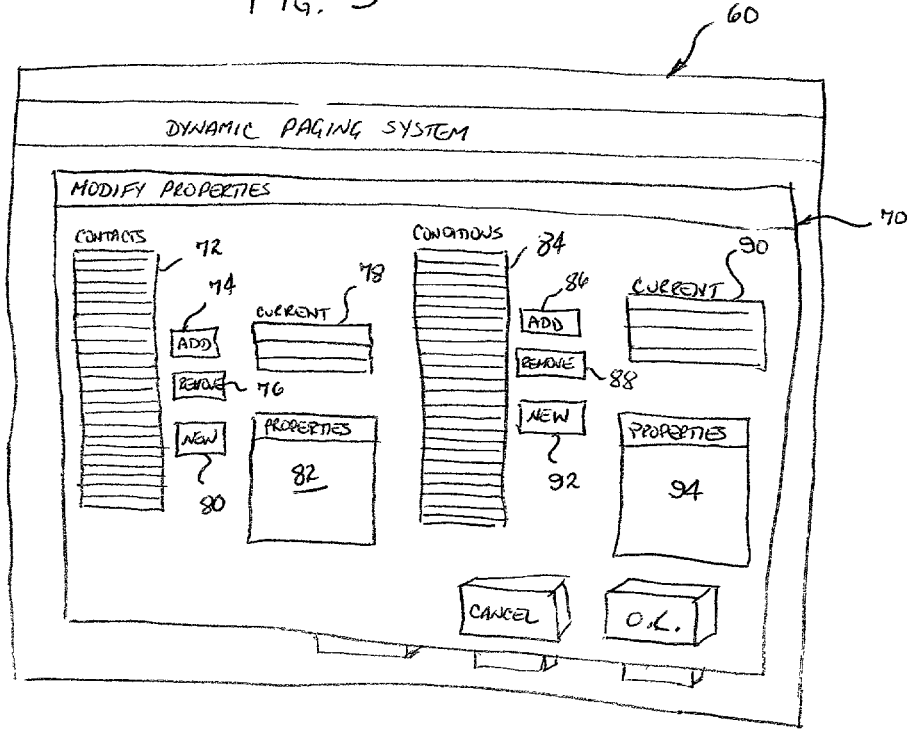
FIG. 5 is another screen display showing one embodiment of a pager GUI configured to facilitate the assignment of contact parties and triggering conditions.

In order to modify either or both of the assigned contact and triggering condition(s), the P-GUI 60 also includes a modify icon 66. When a system user selects the modify icon 66, a paging system modification window 70 will be superimposed on the P-GUI 60 (FIG. 5).

The modification window 70 displays, in a contact list 72, all of the available contact parties to which a pager telephone call may be directed. Icons 74 and 76 allow desired contact parties to be added to or removed from the currently assigned contact field 78, respectively. Also provided is a new contact icon 80, which allows a user to enter a new contact to add to the contact list 72. Whenever an available contact is highlighted, the properties related to that contact will be displayed in a contact properties field 82. The contact properties field is also where a user will add information related to a new contact when one is entered into the system. The information provided in the contact properties field will be stored in the paging system database 46 (FIG. 3) for recall at an appropriate time by the pager telephone call processor 44 (FIG. 3).

In a similar manner, all of the potential conditions that could trigger a pager telephone call are provided in a condition list 84. Add and remove icons 86, 88 are provided to allow a specified condition to be added to or removed from a current trigger condition field 90. A new condition icon 92 is also provided to allow a new triggering condition to be defined and added to the available condition list 84. Like the contact properties field 82 mentioned above, a condition properties field 94 is provided to allow properties related to a condition to be defined by and displayed to a system user.

Figure 6:
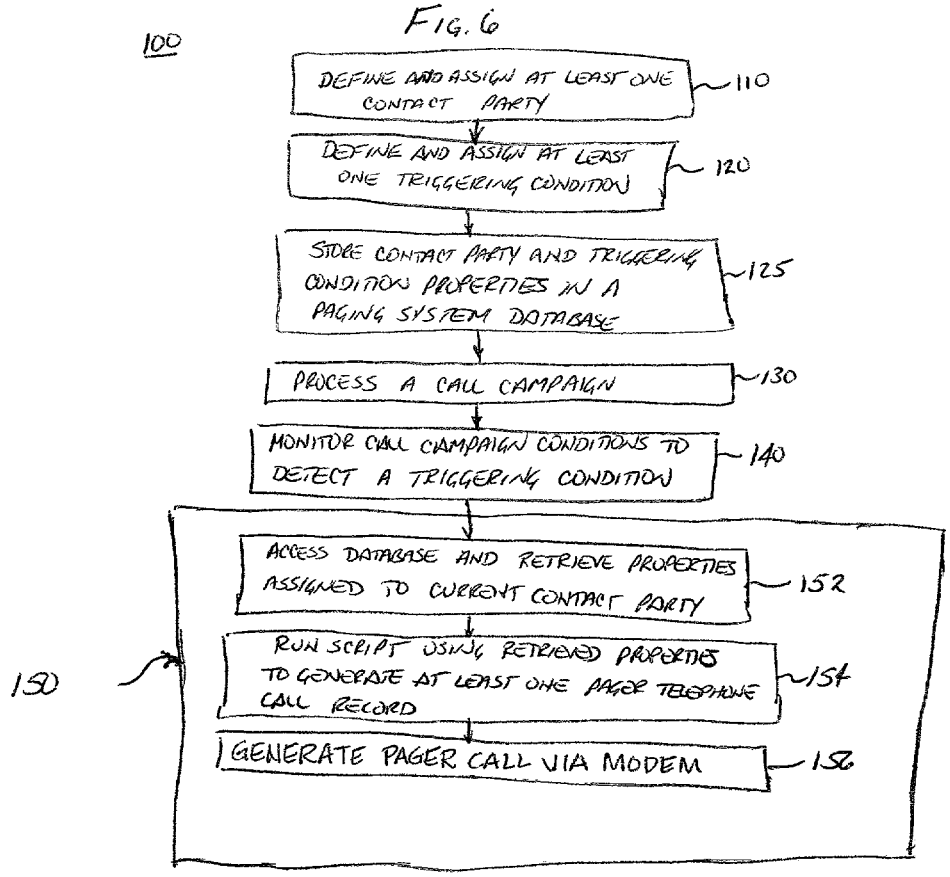
FIG. 6 is a flow diagram showing one embodiment of a method of paging an individual upon the occurrence of a predefined condition according to the present invention.

Turning now to FIG. 6, one embodiment of a method of contacting a desired party upon the occurrence of a specified condition in a computerized telephony system is provided. The method 100 begins, in acts 110 and 120, by defining and assigning at least one party to contact and at least one condition to trigger the generation and processing of a pager telephone call record, respectively. In act 125, the defined and assigned parties and conditions are stored in a paging system database.

Once at least one contact party and at least one triggering condition are defined and assigned, the method continues with the processing of a telephone call campaign, act 130. During the campaign processing, campaign conditions are monitored to detect if the at least one triggering condition occurs, act 140.

When a triggering condition is detected, the method continues with act 150, which includes the generation and processing of a pager telephone call record to result in the placement of a pager telephone call to a currently assigned contact party. The generation and processing act itself includes the act of accessing the paging system database and retrieving the identity and properties assigned to the currently assigned contact party, act 152. Next, a pager telephone call processor runs a script to generate at least one pager telephone call record that utilizes assigned contact properties that are retrieved from the paging system database, act 154.

Lastly, the at least one pager telephone call is placed to the currently assigned contact party, act 156.

Of course, with more sophisticated paging systems, sophisticated scripts can be run to provide paging signals that include information such as the exact nature of the condition that triggered the page, and the like.

Modifications and substitutions by one of ordinary skill in the art are considered to be within the scope of the present invention which is not to be limited except by the claims which follow.

What is claimed is:

1. A method of contacting an assigned contact party upon the occurrence of at least one pre-defined condition during the processing of a telephone call campaign by a computer telephony system, said method comprising the acts of:

defining and assigning at least one contact party to said telephone call campaign being processed by said computer telephony system;

defining and assigning at least one condition to trigger a pager telephone call to said at least one contact party during the processing of said telephone call campaign by said computer telephony system;

storing properties associated with said at least one contact party and said at least one triggering condition in a paging system database;

monitoring said telephone call campaign during its processing to detect the occurrence of said at least one triggering condition; and generating and processing a pager telephone call upon the detection of said at least one triggering condition.

2. The method of claim 1, wherein said acts of generating and processing a pager telephone call upon the detection of said at least one triggering condition comprises:

accessing said pager system database upon the occurrence of said at least one triggering condition and retrieving properties assigned to a current contact party;

retrieving and running a script associated with said detected triggering condition to generate at least one pager telephone call including said retrieved current contact party properties; and generating at least one pager telephone call.

3. A computerized telephony dynamic paging system comprising:

a paging system database containing properties associated with at least one contact party and at least one trigger condition;

a condition monitor, adapted to monitor conditions of a call campaign being processed by a computer telephony system, to detect at least one trigger condition;

a pager telephone call processor, responsive to a detected trigger condition and said paging system database, for generating and processing a pager telephone call upon the detection of said at least one trigger condition; and at least one prepared script for processing by said pager telephone call processor, said script responsive to said properties contained in said paging system database wherein said script further retrieves properties associated with said detected condition and provides said properties to said contact party in a numeric pager message.

4. A system of contacting an assigned contact party upon the occurrence of at least one pre-defined condition during the processing of a telephone call campaign by a computer telephony system, said system comprising:

a means for defining and assigning at least one contact party to said telephone call campaign being processed by said computer telephony system;

a means for defining and assigning at least one condition to trigger a pager telephone call to said at least one contact party during the processing of said telephone call campaign by said computer telephony system;

a means for storing properties associated with said at least one contact party and said at least one triggering condition in a paging system database;

a means monitoring said telephone call campaign during its processing to detect the occurrence of said at least one triggering condition; and a means generating and processing a pager telephone call upon the detection of said at least one triggering condition.

* * * * *